United States Patent [19]
Bower

[11] Patent Number: 5,946,374
[45] Date of Patent: Aug. 31, 1999

[54] PAIR GAIN TEST UNIT FOR USE IN A COMBINED TELEPHONY/VIDEO CO-AXIAL CABLE TERMINATION UNIT

[75] Inventor: David M. Bower, Sonoma County, Calif.

[73] Assignee: Alcatel USA Sourcing, L.P., Plano, Tex.

[21] Appl. No.: 08/989,952

[22] Filed: Dec. 12, 1997

[51] Int. Cl.$^6$ .............................. H04M 1/24; H04N 17/00
[52] U.S. Cl. ................................ 379/29; 379/32; 348/192
[58] Field of Search .................................. 379/1, 5, 6, 22, 379/24, 26, 27, 28, 29, 30, 32, 34; 348/13, 14, 192

[56] References Cited

U.S. PATENT DOCUMENTS

| | | | |
|---|---|---|---|
| 4,270,030 | 5/1981 | Brolin et al. | 179/175.2 |
| 5,615,225 | 3/1997 | Foster et al. | 379/29 |
| 5,774,524 | 6/1998 | Yang | 348/192 |
| 5,818,906 | 10/1998 | Grau et al. | 379/1 |

Primary Examiner—Paul Loomis
Attorney, Agent, or Firm—Fliesler Dubb Meyer & Lovejoy LLP

[57] ABSTRACT

A test system for performing pair gain tests within a co-axial cable termination unit of a combined telephony/video system is described. The combined telephony/video system provides a set of telephony channels and video channels to the co-axial cable termination unit over a single combined telephony/video transmission line. The co-axial cable termination unit includes interface circuitry in the form of modems, CODEC's, and the like, for interfacing the set of telephony channels provided on the combined telephony/video transmission line with a set of respective telephone lines connected into a subscriber location The interface circuitry also routes the video channel of the combined telephony/video transmission line onto a video-only co-axial cable also connected into the subscriber location. To accommodate pair gain testing, the co-axial cable termination unit also includes a pair gain test unit for verifying the operation of a single telephony channel provided on the combined telephony/video transmission line and a switch for connecting the pair gain test unit to a selected one of the set of telephone lines connected to the interface system to permit the test unit to test the telephony channel associated with the selected telephone line. In this manner only a single pair gain test unit is required within each co-axial cable termination unit.

31 Claims, 4 Drawing Sheets

PAIR GAIN TEST UNIT FOR USE IN A COMBINED TELEPHONY/VIDEO CO-AXIAL CABLE TERMINATION UNIT

BACKGROUND OF THE INVENTION

1. Field of the Invention

The invention generally relates to co-axial transmission systems for transmitting both telephony and video signals to subscriber locations and in particular to pair gain test units for use therein.

2. Description of the Related Art

Co-axial cables have been widely deployed for providing video signals, such as cable television (CATV) signals, to subscriber locations, i.e. homes or offices. Currently, systems are being developed for also providing telephony signals over the co-axial cables, such as signals carrying telephone calls, facsimile transmissions, Internet data communications and the like. One such system, Mediaspan™, is currently being developed by DSC Communications, the assignee of rights to the present invention.

With systems for providing both video and telephony signals over a single co-axial cable, the single cable thereby carries both downstream signals (i.e. signals sent to the subscriber location) and upstream signals (i.e. signals sent from the subscriber location). The downstream signals include both video and telephony signals. The upstream signals typically include only telephony. In some systems, though, upstream signals additionally include upstream video signals such as may be required with interactive television systems.

Separate transmission frequencies are used to distinguish the downstream signals from the upstream signals. The frequency range of 450 to 750 MHz is employed for downstream signals and the frequency range of 5 to 50 MHz is employed for upstream signals. Discrete multiwave tones (DMT) may be employed to transmit the upstream signals, particularly so as to overcome noise problems inherent in upstream co-axial cable transmissions. Such noise problems occur, for example, as the result of the presence of noise sources within the 5 to 50 MHz band (such as motors, washers, compressors and the like) operating near the downstream end of the co-axial cable.

Separate transmission frequencies are also used to distinguish downstream telephony signals from downstream video signals and to distinguish upstream telephony from upstream video signals, if any. Moreover, as to the telephony signals, otherwise conventional pair gain techniques may be employed to permit simultaneous transmission of two or more telephony channels both upstream and downstream to thereby permit, for example, two separate telephone conversations to proceed simultaneously using two separate telephones at the subscriber location. The signals carried on the telephony channels are typically encoded digitally for transmission using, for example, T1 framing.

When implementing such a combined video/telephony co-axial cable transmission system, a co-axial termination unit (CTU) may be provided at each individual subscriber location, with hundreds or perhaps thousands of CTU's connected to a single combined video/telephony co-axial cable. Each CTU is connected to the combined video/telephony co-axial cable via a tap. The CTU is also connected to both the upstream end of a video-only co-axial cable connected into the subscriber location and the upstream ends of any telephone lines that are also connected into the subscriber location. The video-only co-axial cable is typically connected to a television set or video cassette recorder (VCR) at the subscriber location. Tip and ring lines of the telephone lines are typically connected to a telephone, facsimile machine or modem at the subscriber location.

Thus CTU provides an interface between the combined video/telephony co-axial cable and the video-only co-axial cable and separate telephone lines connected into a single subscriber location. To this end, the CTU includes components for converting radio frequency (RF) digital telephony signals received on the telephony channels of the combined video/telephony co-axial cable to analog telephone signals for coupling to the tip and ring lines of the subscriber telephone lines. Likewise, the CTU includes components for converting analog signals received from the tip and ring lines to digital RF signals for transmitting over the combined video/telephony co-axial cable. A modem and a coder-decoder (CODEC) may be employed to handle the conversions. Also the CTU includes circuitry for routing the video signals received from the combined video/telephony co-axial cable to the video-only co-axial cable routed into the subscriber location. The video-only co-axial cable is referred to herein as a "video-only" cable only because, in use, it carries only video signals. The video-only co-axial cable is, however, an otherwise standard co-axial cable which could carry other signals as well.

The components of the CTU are powered by a power signal, typically provided at 90 Volts, carried along the combined video/telephony co-axial cable, i.e. the combined video/telephony co-axial cable is a "wet" cable. Components of the CTU ensure that power is not forwarded onto the video-only co-axial cable connected into the subscriber location and that only standard POTS (i.e. plain old telephone system) power voltages are coupled to the telephone lines. In this manner the presence of the CTU is entirely transparent to the operation of the televisions, VCR's, telephones and the like at the subscriber location which can thereby operate as if receiving signals from standard CATV cables or POTS telephone lines.

An upstream end of the combined video/telephony co-axial cable is connected via an appropriate interface system into a telephone company central office (CO) provided with switching equipment for routing telephone signals to and from the public switched telephone network (PSTN). The interface system receives telephone signals from the PSTN via the CO and also receives video signals from a suitable video source, such as a CATV service provider or a satellite dish, and combines those signals onto the combined video/telephony co-axial cable for transmission to the CTU.

The CO also includes pair gain test equipment for testing the telephony channels carried over the combined video/telephony co-axial cable. Pair gain tests are typically performed periodically to verify that all telephony channels are operational. Also, pair gain tests are performed whenever a problem report is received, such as if a subscriber complains that telephone service has been disrupted. To permit the CO to perform the pair gain test, the CTU must have appropriate equipment for receiving pair gain test signals from the CO over the telephony channels of the combined video/telephony co-axial cable and for responding with appropriate reply signals. Problems arise, however, when implementing pair gain test equipment within CTU's that provide two or more output telephone lines to the corresponding subscriber location. Because a separate CTU is provided at each separate subscriber location, it is important that the costs of each CTU be minimized and that the reliability of the components of each CTU be maximized. However, the need to provide separate pair gain test equipment within each CTU for each separate output telephone line provided by the CTU increases costs and also increases the chances that the pair gain test equipment of any particular CTU may become defective requiring on-site maintenance. Accordingly it would be desirable to provide an implementation of pair gain test equipment within a CTU that reduces costs and increases reliability and it is to that end that aspects of the present invention are primarily directed. It should be noted that the systems described in this Background section are not necessarily prior art to the present invention.

SUMMARY OF THE INVENTION

In accordance with one aspect of the invention, a system is provided for testing portions of a combined telephony/video system providing a plurality of telephony channels and a video channel to a subscriber location over a single combined telephony/video transmission line. The system includes interface means for interfacing the plurality of telephony channels provided on the combined telephony/video transmission line with a plurality of respective telephone lines connected into the subscriber location and for interfacing the video channel with a co-axial cable also connected into the subscriber location. The system also includes test means, connected to the interface means, for verifying the operation of a single telephony channel provided on the combined telephony/video transmission line and connection means for connecting the test means to a selected one of the plurality of telephone lines connected to the interface means to permit the test means to test the telephony channel associated with the selected telephone line.

In an exemplary embodiment, the combined telephony/video transmission line is a co-axial cable and the interface means is a co-axial cable termination unit installed at the subscriber location. The test means is a pair gain test means for performing a pair gain test on a single telephony channel. The connection means includes means for receiving a pair gain test request signal on one of the plurality of telephony channels and means, responsive to reception of the pair gain test request signal, for routing pair gain test signals between the pair gain test means and the telephone line corresponding to the telephony channel upon which the pair gain test request signal was received. The means for receiving a pair gain test request signal includes means for determining whether a pair gain test is already being performed on one of the other telephony channels and means, responsive to a determination that a pair gain test is already being performed on another telephony channel, for generating a signal indicating that a pair gain test cannot currently be performed on the telephony channel upon which the pair gain test request signal was received.

Also in the exemplary embodiment, the plurality of telephony channels include first and second telephony channels and the plurality of telephone lines include first and second telephone lines. The means for routing pair gain test signals includes a test bus connected to the pair gain test means. A first switch interconnects the test bus to the first telephone line, with the first switch operating to connect the test bus to the first telephone line in response to a pair gain test request signal received on the first telephony channel. A second switch interconnects the test bus to the second telephone line, with the second switch operating to connect the test bus to the second telephone line in response to a pair gain test request signal received on the second telephony channel.

In the exemplary embodiment, by providing a pair gain test means for testing only a single telephony channel and by providing connection means for connecting the pair gain test means to a selected one of the plurality of telephone lines, any of the various telephony channels can be efficiently tested while nevertheless reducing the costs required to implement the system, in part, by utilizing only the single pair gain test means. Reliability is also enhanced, in part, because fewer components are required.

Other aspects of the invention as well as other advantages of the invention are provided as well. Method embodiments of the invention are also provided.

DETAILED DESCRIPTION OF THE INVENTION

The invention relates to a system for implementing pair gain testing in a CTU receiving video and telephony. The invention will be described initially with reference to an exemplary embodiment wherein an arbitrary number of telephony channels are provided to each subscriber location and then with respect to a specific embodiment wherein two telephony channels are provided. Principles of the invention may be applicable to other systems as well.

Figure 1:
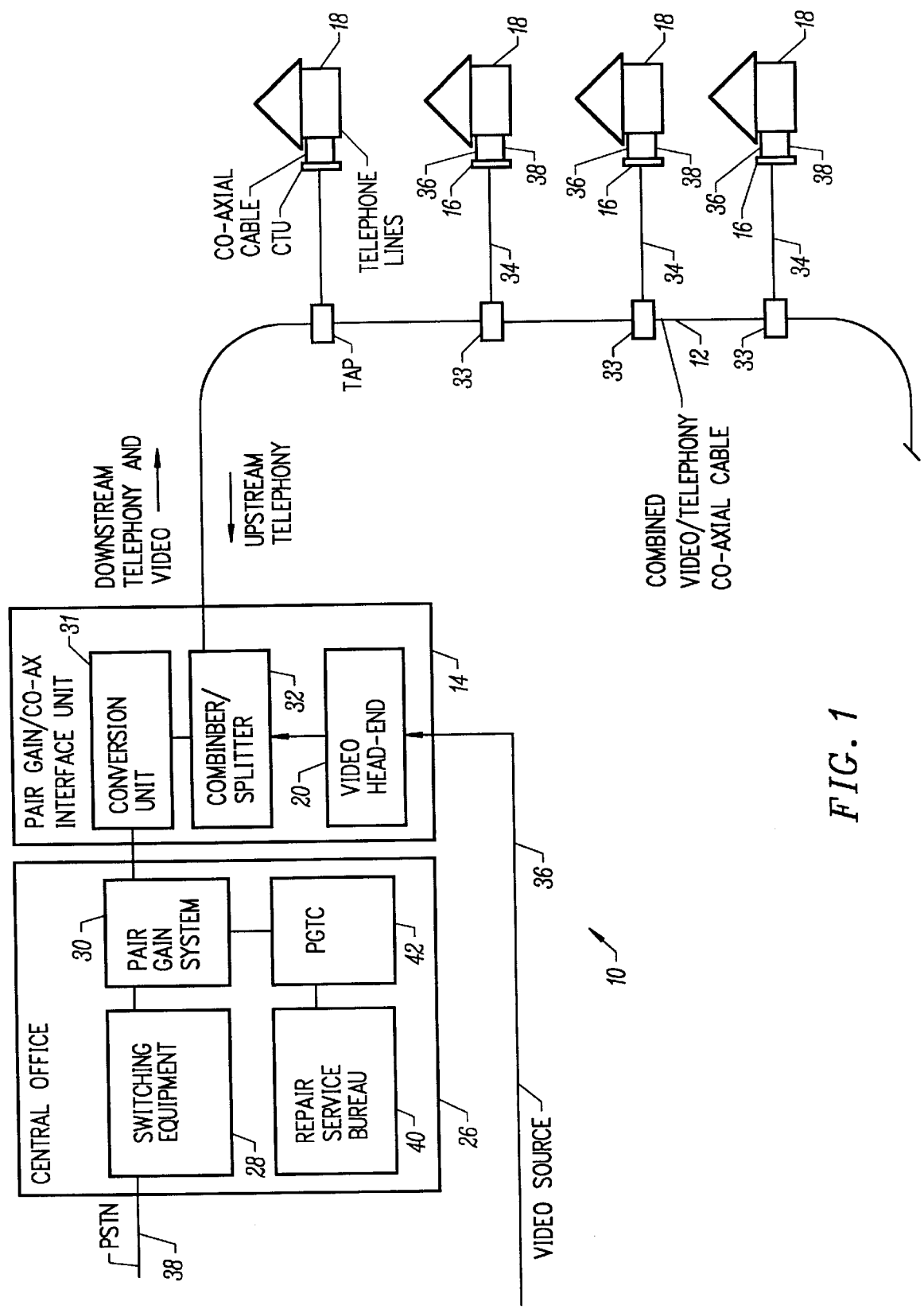
FIG. 1 is a block diagram of a system providing both telephony and video to subscriber locations using a single co-axial cable interconnecting a set of CTU's with a CO via a pair gain/co-ax interface unit.

FIG. 1 illustrates a combined video/telephony transmission system 10 having a combined video/telephony transmission co-axial cable 12 interconnecting a pair gain/co-ax interface unit 14 with a set of CTU's 16 located at respective subscriber locations 18 which may be, as shown, individual houses. Cable 12 carries downstream RF video signals from pair gain/co-ax interface unit 14 to the CTU's of the subscriber locations 18 and carries both upstream and downstream RF telephony signals between the pair gain/co-ax interface unit and the CTU's. At least two separate telephony channels are carried on cable 12 for each CTU 16 connected to cable 12. Typically 500 to 1000 CTU's are connected to the pair gain/co-ax interface unit via cable 12. Since CTU's of numerous subscriber locations are connected to cable 12, numerous telephony channels may be simultaneously carried over the cable. Moreover numerous video channels, perhaps corresponding to various CATV channels, are also carried on cable 12.

Pair gain/co-ax interface unit 14 receives the video channels via a video head end unit 20 from a video source line 22 which is connected to a CATV service provider (not shown) or perhaps to a satellite dish (also not shown). Pair gain/co-ax interface unit 14 also receives downstream telephony signals from a PSTN line 24 (or inter-office trunk line) via a central office (CO) 26. More specifically, downstream telephony signals are routed by switching equipment 28 (such as a standard electronic, cross-bar or step-by-step switching system) to a pair gain system 30 which forwards the telephony signals on conventional pair gain loop-type channels to pair gain/co-ax interface unit 14 with one pair gain telephony channel corresponding to each subscriber telephone number of each subscriber connected via cable 12. A conversion unit 31 converts the pair gain telephony signals received from the pair gain system into RF digital signals appropriate for transmission over cable 12 and routes the converted signals to a combiner/splitter 32. The combiner/splitter combines the RF telephony channels with the RF video channels received from video source 22 and transmits the combined video/telephony channels downstream using standard multi-frequency RF transmission techniques on cable 12 at various frequencies within the range of 450 to 750 MHz. In an implementation wherein the pair gain system outputs analog pair gain signals, conversion unit 31 performs analog to digital conversions of received pair gain signals. In an implementation wherein the pair gain system outputs digital pair gain signals, perhaps using synchronous optical network (SONET) techniques, conversion unit 31 performs whatever digital signal conversions are appropriate for converting the format of the received digital pair gain signals to a format appropriate for RF transmission over co-axial cable 12.

Each of the telephony channels and each of the video channels are routed via taps 33 and tap lines 34 to each CTU 16. Each CTU 16 splits the RF video signal portion from the combined RF signal and routes the RF video signals over a respective co-axial cable 36 into the respective subscriber location for connection therein to a TV or VCR. Preferably, the video signals are scrambled. Only those subscribers having appropriate de-scrambler units are capable of de-scrambling and viewing the video signals. In other implementations, the CTU routes only those channels, if any, that the subscriber is authorized to receive. In such case, no de-scrambler is required.

Each CTU 16 also splits off two or more RF telephony channels from the combined signal received on cable 12, converts the digital telephony signals carried on the telephony channels to analog telephone signals and routes the analog signals over physical telephone lines 38 into the respective subscriber location. More specifically, each CTU splits off those telephony channels designated for connection to the respective subscriber location. Each telephony channel is routed onto a respective separate telephone line. In this manner, telephone calls are routed only to the intended subscriber location and only to the intended telephone line of the subscriber location to ensure that telephone conversations or other telephony communications are connected only to the appropriate parties. In the embodiment illustrated in FIG. 1, each subscriber location may receive an arbitrary number of telephony channels and so an arbitrary number of telephone lines are provided between each CTU and its respective subscriber location. In a specific embodiment to be described below, each subscriber location receives two telephony channels and so only two telephone lines are associated with each CTU.

Upstream telephony signals received by CTU 16 via telephone lines 38 are combined by the CTU then transmitted using DMT within a frequency range of 5 to 50 MHz onto the respective tap line 34 then further combined onto cable 12 and routed to pair gain/co-ax interface unit 14. Combiner/splitter 32 of the pair gain/co-ax interface unit splits the upstream telephony signals onto separate pair gain lines for routing via conversion unit 31 to pair gain system 30 and ultimately to PSTN 24 via switching equipment 28. For telephone calls between two subscribers connected to the same CO, the calls are, of course, not routed to the PSTN, but are instead only routed by the CO between the two subscribers. Also, in other embodiments, cable 12 may additionally carry upstream video signals such as may be required for use with interactive television systems.

Thus combined video/telephony co-axial cable 12 provides both telephony and video to the subscriber locations. To allow testing of the telephony channels carried on the cable, CO 26 includes a repair service bureau 40 and a pair gain test controller (PGTC) 42. Repair service bureau 40 provides for the initiation and control of manual or automatic tests on the pair gain channels generated by pair gain system 30. The actual tests initiated by repair service bureau 40 are conducted by PGTC 42 which generates conventional pair gain loop-around test signals for routing over the telephony channels of cable 12 via pair gain system 30 for testing specific telephony channels corresponding to specific subscriber telephone numbers. The pair gain test signals are received by the CTU 16 of the subscriber location corresponding to the telephony channel being tested. The pair gain signals are processed within the CTU in a manner to be described below with reference to FIG. 2 and responsive pair gain test signals are routed upstream over cable 12 to PGTC 42 via pair gain/co-ax interface unit 14 and pair gain system 30. The reply signals are examined by PGTC 42 to verify the integrity of the pair gain telephony channel being tested and the results of the test are forwarded to repair service bureau 40. (The pair gain tests described herein are intended to test only a selected telephony channel carried over cable 12 and are not intended to test the telephone lines coupled to the downstream end of the selected telephony channel, i.e. no "facility" test is performed, only channel tests are performed.) If the tests indicate a problem with the telephony channel, then a trouble report is generated and appropriate action is taken including, for example, dispatching repair personnel to the appropriate subscriber location. To accommodate simultaneous testing of separate pair gain channels to separate subscriber locations, PGTC 42 may be provided with a set of identical internal pair gain test units (not separately shown).

Each of the components of CO 26, including repair service bureau 40 and PGTC 42 may be entirely conventional. Also, although not shown, CO 26 may additionally be connected to various other subscriber locations through conventional metallic loops or other conventional connection means.

Figure 2:
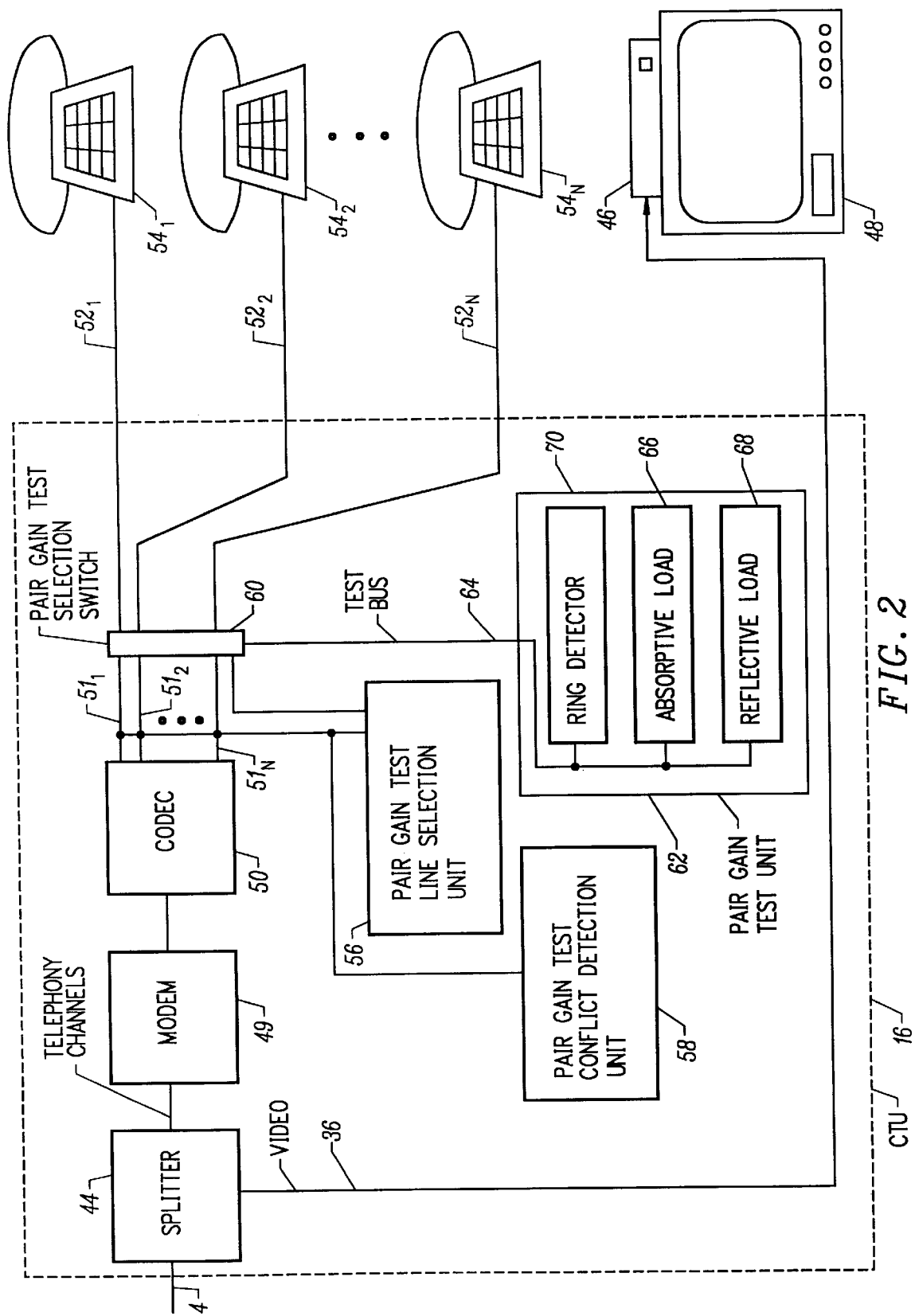
FIG. 2 is a block diagram illustrating pertinent components of one of the CTU's of the system of FIG. 1 and particularly illustrating components for performing a pair gain test within the CTU.

Pertinent components of one CTU 16 are illustrated in FIG. 2. A splitter/combiner 44 receives the combined video/telephony RF signals from tap line 24 and splits the RF video off for routing along coaxial cable 36 to a subscriber de-scrambler box 46 for ultimate display on television 48. RF telephony channels are routed from splitter/combiner 44 into a modem 49 which converts the RF signals to non-RF digital telephony signals which are, in turn, routed to a CODEC 50 which converts the digital signals to analog telephone signals and routes the analog telephone signals via internal lines $51_1$–$51_N$ (each having separate tip and ring lines not shown), onto separate output telephone lines $52_1$–$52_N$ (each also having separate tip and ring lines) which conduct the signals to respective telephony devices $54_1$–$54_N$ which may be, as shown, telephones or other telephony devices such as computer modems, facsimile machines, and the like. As noted above, CTU 16 receives all telephony channels carried on cable 12 (FIG. 1). Accordingly, modem 49 outputs only those telephony signals intended for telephony devices 54 of the respective subscriber location as determined by examining unique routing signals provided with the telephony signals. All other telephony channels, i.e. telephony channels intended for other subscriber locations, are ignored. Upstream analog telephony signals received along telephone lines 52 from telephony devices 54 are converted to digital signals by CODEC 50, converted to RF by modem 49, then combined and transmitted by splitter/combiner 44 onto tap line 24 for ultimate routing to pair gain/co-ax interface unit 14 (FIG. 1).

Thus, with the arrangement shown, up to N separate telephone conversations or other telephony communications may be conducted simultaneously each consisting of various upstream and downstream telephony signals carried over separate telephony channels. Pair gain test line selection unit 56 continuously monitors all downstream telephony signals conducted on all internal lines 51 to detect any signals (such as NSEIZE signals) requesting initiation of a pair gain test on a corresponding one of the telephony channels. If such a signal is received, pair gain test conflict detection unit 58 determines whether a pair gain test is already being performed on one of the other telephony channels. Thus, if an NSEIZE signal or other pair gain test initiation signal is detected on line $51_1$ (indicating that the telephony channel corresponding thereto has been selected for a pair gain test), but a pair gain test is already being performed on the telephony channel corresponding to line $51_2$ then an appropriate refusal signal (such as an SZEBSY signal) is generated by the pair gain test conflict detection unit and routed back to the pair gain test controller (FIG. 1) via the corresponding telephony channel. If, however, no pair gain test is currently being conducted on any of the other telephony channels, then an appropriate acknowledgment signal (such as an SEIZE RC signal) is generated by the pair gain test conflict detection unit and routed back to the pair gain test controller (FIG. 1) via the selected telephony channel. In reply, the pair gain test controller transmits a signal to initiate a pair gain test (such as a SEIZE signal) and, in response thereto, pair gain test line selection unit 56 controls a pair gain test selection switch 60 to connect a pair gain test unit 62 to the line specific 51 corresponding to the telephony channel selected for the pair gain test and to disconnect the corresponding telephone line 52 coupled into the subscriber location. The pair gain test unit is connected to the selected line 51 using a test bus 64. In this manner, the subscriber telephony device corresponding to the selected telephony channel is disconnected from the corresponding telephone lines and the pair gain test unit is instead connected thereto. Pair gain test unit 62 includes an absorptive load generator 66 and a reflective load generator 68 which replicate the expected absorptive and reflective loads that would otherwise occur if the telephone line were still connected to the selected telephony channel.

Subsequently, various pair gain test signals are transmitted by the pair gain test controller (FIG. 1) along the selected telephony channels, intercepted by test bus 64 and routed to pair gain test unit 64 which generates responsive reply signals. For example, a ring signal may be sent from the pair gain test controller to the pair gain test unit. A ring detector 66 of the pair gain test unit detects the ring signal and generates an appropriate reply. Other appropriate pair gain test signals may be used to test other aspects of the connection including, for example, echo return loss, channel loss, and channel noise. If appropriate reply signals are not received by pair gain test controller (FIG. 1), then the aforementioned trouble report is generated and appropriate remedial action is taken. For example, if no reply to the ring signal is received, then there is clearly a fault of some type, perhaps somewhere in the combined video/telephony co-axial cable or in the CTU. As another example, if no appropriate reply to the pair gain test request signal (i.e. the NSEIZE signal) sent by the pair gain test controller is received, then such is also an indication of a fault.

Upon completion of the various tests, an appropriate pair gain test termination signal (such as a RELEASE signal) is transmitted by pair gain test controller (FIG. 1) to the CTU. Pair gain test selection unit 56 detects the signal and controls pair gain test selection switch to disconnect test bus 64 from selected line 51 and to reconnect the corresponding telephone line thereto.

While a pair gain test is being conducted on any one of the telephony channels, all other telephony channels processed by CTU 16 may be used by the subscriber. In other words, pair gain test selection switch 60 only disconnects to telephone line corresponding to the selected telephony channel. All other telephone lines remain connected.

By providing a single pair gain test unit for selective connection to any of the tip and ring lines output by the CTU for testing any of the telephony channels processed by the CTU, significant cost savings can be achieved over systems requiring a separate pair gain test unit for each telephony channel. This is particularly important given that a separate CTU may be required for each of up to 500 or 1000 separate subscriber locations. Moreover, with only a single pair gain test unit, reliability is improved because there is less equipment that might fail within the CTU. Still other advantages, not specifically listed here, may be gained by configuring the video/telephony system as shown in FIGS. 1 and 2. All components of the CTU are operated by power received over co-axial cable 12.

With reference to the remaining figures, a specific exemplary system provided by DSC Communications referred to herein as Mediaspan™ will now be described. DSC Communications is the assignee of rights to the present invention. Mediaspan™ performs the functions of the system already described and only pertinent functional differences will be described in detail.

Figure 3:
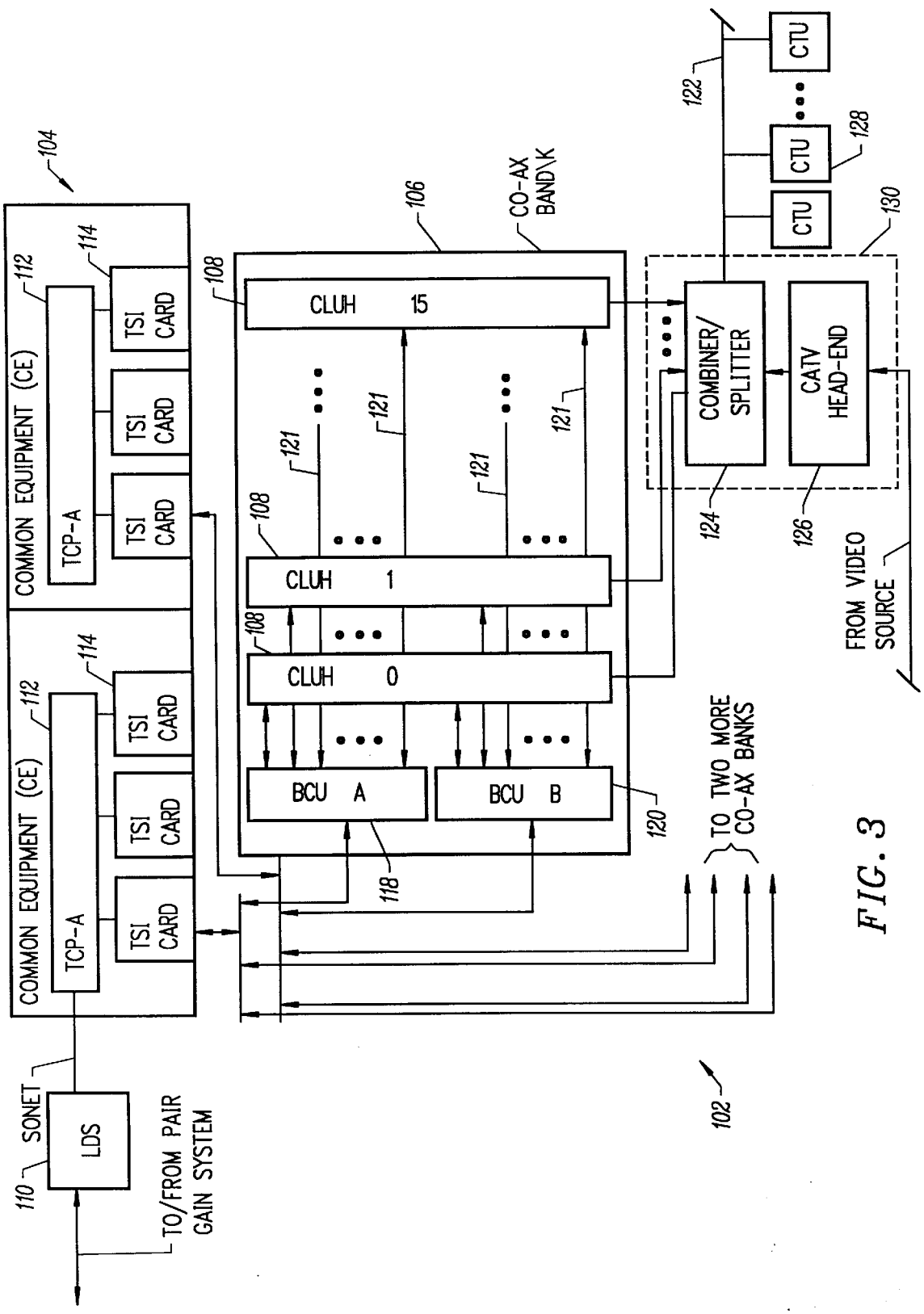
FIG. 3 is a block diagram illustrating pertinent components of a specific pair gain/co-axial interface system for use with the system of FIG. 1 for use in converting between digital pair gain telephony signals received from the CO and RF co-axial cable telephony signals carried over the co-axial cable.

FIG. 3 illustrates a pair gain/co-ax interface unit 102 for use with Mediaspan™. The pair gain/co-ax interface unit is herein also referred to as a LiteSpan® system. The pair gain/co-ax interface unit includes a common control shelf having common equipment (CE) 104 and up to nine channel bank shelves each carrying one of a number of different types of channel banks. One such channel bank is a co-axial bank 106 containing a set of up to sixteen co-ax line unit head-end (CLUH) units 108. CE 104 communicates with a pair gain system of a CO (not shown in FIG. 3) via a local digital switch (LDS) 110 using SONET techniques. CE 104 includes two terminal control processors (TCP) 112 each connected to up to three time slot interchange (TSI) cards 114. Two sets of TCP's and TSI's are provided for redundancy. The two sets are referred to herein as the A set and the B set.

Each TSI 114 supports up to three TSI cables 116 (only one of which is shown) for a total of nine TSI cables, one for each of the nine channel banks. (Further redundancy may be provided by doubling the number of cables.) Each TSI cable includes a 16 MHz data rate 8-bit-wide bus for each of the upstream and downstream directions for a total of 16 bits per TSI cable 116.

Within co-ax bank 106, the bi-directional A-side TSI cable is connected to an A-side bank control unit (BCU) 118 and the bi-directional B-side TSI cable is connected to a B-side BCU 120. The BCU's may be implemented using fiber bank interface units (FBIU's) as found in conventional optical network units (ONU). Each BCU functions as an interchange between the TSI cable data transmission format and a backplane bus format. Each TCP 112 can program the corresponding BCU (118 or 120) with a map of TSI buses to back plane buses.

A backplane bus 121 of co-ax bank 106 includes sixty-four individual conductors (not separately shown). Four of the conductors are connected to each of the sixteen CLUH's 108 that can be inserted into the co-ax bank 106. Of the four conductors, two (one upstream and one downstream) are connected to BCU 118 and two are connected to BCU 120. The upstream pair that connect one CLUH with one BCU are octal buses that carry eight bi-directional 4.096 MHz "subscriber buses". The eight subscriber buses are time domain multiplexed (TDM) on the respective conductor such that each conductor carries bits from all eight subscriber buses in a round-robin fashion. The bit rate for each subscriber bus is 4.096 MHz and the overall bit rate on each conductor is 16.384 Mbits/sec. Typically, only three of the subscriber buses on each conductor pair are in use, specifically buses 5–7.

The active subscriber buses on each backplane conductor are further time domain multiplexed to carry up to 64 kbps data rate digitized analog signals (DS0'). Up to sixty-four of the DS0's carry conversations and the remainder are employed for control functions such as transmission of the aforementioned pair gain test control signals. In co-ax bank 106, each CLUH 108 processes the sixty-four DS0's carried on the octal backplane bus to which the CLUH is assigned. Each CLUH is pre-assigned a 2 MHz-wide RF band on a combined video/telephony co-axial cable 122 for downstream traffic and a 2 MHz-wide RF band for upstream traffic. The outputs of the CLUH's are multiplexed onto cable 122 via a combiner/splitter 124 which also receives video signals from a CATV head-end unit 126. The signal are routed downstream through the cable to a set of up to 500 or 1000 CTU's 128. Collectively, the internal components of the pair gain/co-ax interface unit 102 performed all necessary data conversions to interface the pair gain SONET signals received from LDS 110 with the RF DS0's carried over cable 122. Combiner/splitter 124 and CATV head-end unit 126 collectively form a distribution network 130 which may be entirely conventional.

Figure 4:
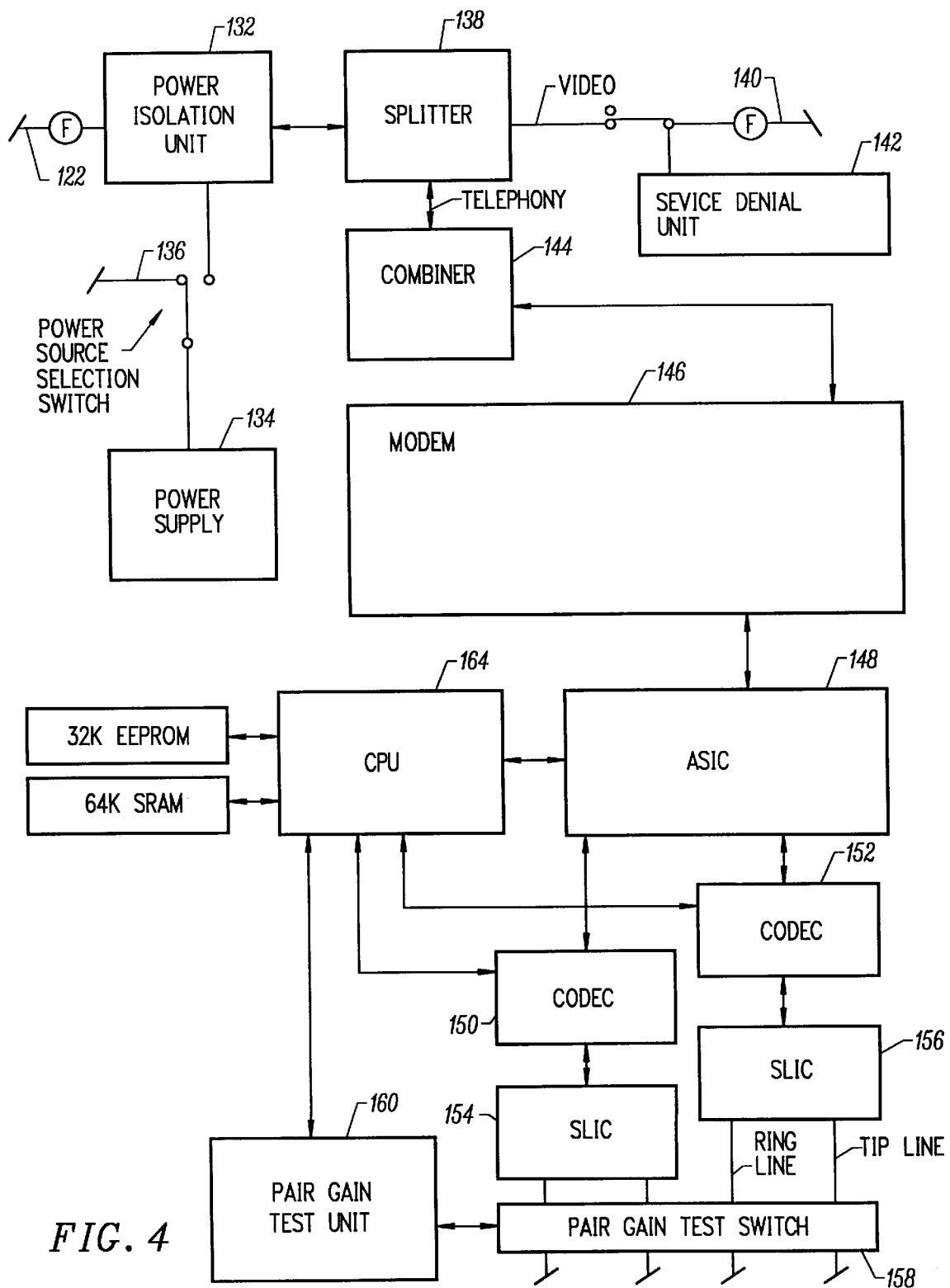
FIG. 4 is a block diagram illustrating pertinent components of a specific CTU for converting between RF co-axial cable telephony signals and two pairs of analog tip and ring telephone lines and having a single pair gain test unit for testing telephony channels associated with the two pairs of tip and ring lines.

FIG. 4 illustrates a single CTU 128 for use with Mediaspan™. Downstream video and telephony signals are received over co-axial cable 122 by a power isolation unit 132 which draws power from the cable. Additional, or alternative power, is supplied by a power supply 134 connected to an input AC power feed 136. RF signals received from cable 122 are routed to a splitter 138 which separates the video and telephony portion of the RF signal. Video portions are routed over a subscriber co-axial cable 140 to a TV or other video device at the subscriber location. A service denial unit 142 is provided to ensure that the subscriber receives the video signal only if authorized, i.e. only is the subscriber has actually subscribed to the CATV service providing the video signals.

Telephony signals are routed from splitter 138 to combiner 144 and in turn to a modem 146 which converts the RF telephony signals to digital telephony signals. Output digital telephony signals from modem 146 are fed through an ASIC 148 and into a pair of CODEC's 150 and 152. ASIC 148 includes circuitry for selecting only those telephony channels intended to be connected to telephony devices at the particular subscriber location where the CTU is mounted. In this exemplary embodiment, only two telephony channels are intended to be routed to subscriber telephony devices. ASIC 148 also provides clock, data and sync signals for driving the CODEC's. The CODEC's convert the digital signals to analog POTS signals for conversion to tip and ring voltage signals using respective subscriber line interface circuits (SLIC's) 154 and 156. Each SLIC has a single pair of tip and ring lines connected thereto which are in turn connected to subscriber telephony devices (not shown). Hence, two pairs of tip and ring lines are provided.

A pair gain test switch 158 is connected to the two pairs of tip and ring lines for connecting one of the pair of tip and ring lines to a pair gain test unit 160 via a test bus 162. Pair gain test unit 160, which includes a ring detector, absorptive load generator and reflective load generator (not separately shown), operates as described above in connection with FIG. 2 to perform pair gain tests on the telephony channel corresponding to a selected pair of tip and ring lines.

A CPU 164 coordinates the functions of the various components of the CTU including the pair gain test unit, the modem, the ASIC's, the SLIC's, etc. As far as the pair gain tests are concerned, the CPU performs the functions of the pair gain test line selection unit 56 (FIG. 2) and the pair gain test conflict detection unit 58 (also FIG. 2) described above to detect the various pair gain test signals and to control pair gain test unit accordingly. CPU 164 utilizes a 32K EEPROM 166 and a 64K SRAM 168 to assist in coordinating pair gain tests and in performing all other control functions required in connection with controlling the overall operation of CTU 128.

What has been described are systems for performing pair gain tests within a system providing digital telephone and analog video signals over a single co-axial cable. The various functional components of the exemplary system may be implemented using any appropriate technology. The exemplary embodiments of the invention described herein are merely illustrative of the invention and should not be construed as limiting the scope of the invention. Also, it should be appreciated that not all components necessary for a complete implementation of a practical system are illustrated or described in detail. Rather, only those components necessary for a thorough understanding of the invention have been illustrated and described.

What is claimed is:

1. A system for testing portions of a combined telephony/video system providing a plurality of telephony channels and a video channel to a subscriber location over a single combined telephony/video transmission line, said system comprising:

interface means for interfacing the plurality of telephony channels provided on the combined telephony/video transmission line with a plurality of respective telephone lines connected into the subscriber location and for interfacing the video channel with a co-axial cable also connected into the subscriber location;

test means, connected to said interface means, for verifying the operation of a single telephony channel provided on the combined telephony/video transmission line; and connection means for connecting the test means to a selected one of the plurality of telephone lines connected to said interface means to permit said test means to test the telephony channel associated with the selected telephone line.

2. The system of claim 1 wherein the plurality of telephony channels provided on the combined telephony/video transmission line are digitally encoded and the plurality of telephone lines each have a pair of analog tip and ring lines and wherein said interface means comprises:

means for converting digitally encoded RF signals received from the combined telephony/video transmission line to analog signals for outputting along the analog tip and ring lines to the subscriber location; and means for converting analog signals received from the analog tip and ring lines to digitally-encoded RF signals for outputting along the combined telephony/video transmission line.

3. The system of claim 1 wherein said test means comprises a pair gain test means for performing a pair gain test on a single telephony channel.

4. The system of claim 3 wherein said pair gain test means includes:

means for detecting an incoming ring signal and for providing responsive signals;

means for generating an absorptive load; and means for generating a reflective load.

5. The system of claim 3 wherein said connection means includes:

means for receiving a pair gain test request signal on one of the plurality of telephony channels; and means, responsive to reception of the pair gain test request signal, for routing pair gain test signals between said pair gain test means and the telephone line corresponding to the telephony channel upon which the pair gain test request signal was received.

6. The system of claim 5 wherein the plurality of telephony channels include first and second telephony channels and wherein the plurality of telephone lines include first and second telephone lines.

7. The system of claim 6 wherein said means for routing pair gain test signals includes a test bus connected to said pair gain test means;

a first switch interconnecting the test bus to the first telephone line, said first switch operating to connect the test bus to the first telephone line in response to a pair gain test request signal received on the first telephony channel; and a second switch interconnecting said test bus to the second telephone line, said second switch operating to connect said test bus to the second telephone line in response to a pair gain test request signal received on second telephony channel.

8. The system of claim 7 wherein said pair gain test means comprises a ring detector, an absorptive load generator, and a reflective load generator; and wherein said means for routing pair gain test signals between said pair gain test means and the telephone line upon which the pair gain test request signal was received further includes a switch interconnecting said absorptive load generator to said test bus and a switch interconnecting said reflective load generator to said test bus.

9. The system of claim 8 wherein said means for receiving a pair gain test request signal includes means for determining whether a pair gain test is already being performed on another telephony channel; and means, responsive to a determination that a pair gain test is already being performed on another telephony channel, for generating a signal indicating that another pair gain test cannot currently be performed.

10. The system of claim 1 wherein the combined telephony/video transmission line is a co-axial cable and wherein said interface means is a co-axial cable termination unit.

11. The system of claim 10 wherein the co-axial cable termination unit is installed at the subscriber location.

12. A method for testing portions of a combined telephony/video system providing a plurality of telephony channels and a video channel to a subscriber location over a single combined telephony/video transmission line, with the combined telephony/video system having an interface unit for interfacing the plurality of telephony channels with a plurality of respective telephone lines connected to the subscriber location and having a test unit for verifying the operation of a single telephony channel, said method comprising the steps of:

receiving a test request signal from the combined telephony/video transmission line on one of the plurality of telephony channels;

selectively connecting the test unit to the telephone line corresponding to the telephony channel upon which the test request signal was received;

receiving test signals from the combined telephony/video transmission line for testing the telephony channel upon which the test request signal was received;

routing the test signals to the test unit;

generating responsive test reply signals using the test unit;

routing the test reply signals from the test unit to the telephone line corresponding to the telephony channel upon which the pair gain test request signal was received; and transmitting the responsive test reply signals along the telephony channel upon which the pair gain test request signal was received using the combined telephony/video transmission line.

13. The method of claim 12 wherein the plurality of telephony channels provided on the combined telephony/video transmission line are digitally encoded and the plurality of telephone lines each have a pair of analog tip and ring lines and wherein said method comprises the further steps of:

converting digitally encoded RF signals received from the combined telephony/video transmission line to analog signals for outputting along the analog tip and ring lines to the subscriber location; and converting analog signals received from the analog tip and ring lines to digitally encoded RF signals for outputting along the combined telephony/video transmission line.

14. The method of claim 12 wherein the test signals comprise pair gain test signals for performing a pair gain test on a single telephony channel.

15. The method of claim 14 wherein said step of generating responsive test reply signals includes one or more of the steps of:

detecting an incoming ring signal and providing responsive signals;

generating an absorptive load; and generating a reflective load.

16. The method of claim 15 wherein the plurality of telephony channels include first and second telephony channels and wherein the plurality of telephone lines include first and second telephone lines.

17. The method of claim 16 wherein the combined telephony/video system includes a test bus connected to the pair gain test unit and wherein said step of routing pair gain test signals includes the steps of:

in response to a test request signal received on the first telephony channel, closing a first switch interconnecting the test bus to the first telephone line to connect the test bus to the first telephone line; and in response to a pair gain test request signal received on the second telephony channel, closing a second switch interconnecting the test bus to the second telephone line to connect the test bus to the second telephone line.

18. The method of claim 17 wherein said step of receiving a test request signal on either the first or the second telephony channel includes the steps of determining whether a pair gain test is already being performed on whichever telephony channel is not identified by the pair gain test request signal;

generating, in response to a determination that a pair gain test is already being performed on the telephony channel not identified by the pair gain test request signal, an error signal indicating that a pair gain test cannot currently be performed on the telephony channel identified by the pair gain test request signal; and transmitting the error signal along the telephony channel upon which the pair gain test request signal was received using the combined telephony/video transmission line.

19. The method of claim 12 wherein the combined telephony/video transmission line is a co-axial cable and the interface means is a co-axial cable termination unit.

20. The method of claim 19 wherein the co-axial cable termination unit is installed at the subscriber location.

21. A system for testing portions of a combined telephony/video system providing a plurality of telephony channels and a video channel to a subscriber location over a single combined telephony/video transmission line, said system comprising:

an interface system for interfacing the plurality of telephony channels provided on the combined telephony/video transmission line with a plurality of respective telephone lines connected into the subscriber location and for interfacing the video channel with a co-axial cable also connected into the subscriber location;

a test unit, connected to said interface system, for verifying the operation of a single telephony channel provided on the combined telephony/video transmission line; and a connection system for connecting said test unit to a selected one of the plurality of telephone lines connected to the interface system to permit said test unit to test the telephony channel associated with the selected telephone line.

22. The system of claim 21 wherein the plurality of telephony channels provided on the combined telephony/video transmission line are digitally encoded and the plurality of telephone lines each have a pair of analog tip and ring lines and wherein said interface system includes:

a combiner/splitter for splitting combined video/telephony signals received from the combined telephony/video transmission line into separate video and telephony signals and for combining separate telephony signals into combined signals for transmission over the combined telephony/video transmission line;

a modem for converting RF telephony signals received from the combined telephony/video transmission line to digital telephony signals;

a CODEC for converting the digital telephony signals received from the modem to analog telephone signals for outputting along the analog tip and ring lines to the subscriber location.

23. The system of claim 21 wherein said test unit comprises a pair gain test unit for performing a pair gain test on a single telephony channel.

24. The system of claim 23 wherein said pair gain test unit includes:

a ring detector;

an absorptive load generator; and a reflective load generator.

25. The system of claim 23 wherein said connection system includes:

a pair gain test line selection unit for receiving a pair gain test request signal on one of the plurality of telephony channels; and a routing system, responsive to reception of the pair gain test request signal, for routing pair gain test signals between said pair gain test unit and the telephone line corresponding to the telephony channel upon which the pair gain test request signal was received.

26. The system of claim 25 wherein the plurality of telephony channels include first and second telephony channels and wherein the plurality of telephone lines include first and second telephone lines.

27. The system of claim 26 wherein said routing system includes a test bus connected to said pair gain test unit;

a first switch interconnecting said test bus to the first telephone line, said first switch operating to connect said test bus to the first telephone line in response to a pair gain test request signal received on the first telephony channel; and a second switch interconnecting said test bus to the second telephone line, said second switch operating to connect said test bus to the second telephone line in response to a pair gain test request signal received on second telephony channel.

28. The system of claim 27 wherein said pair gain test unit comprises a ring detector; an absorptive load generator; and a reflective load generator; and wherein said routing system further includes a switch interconnecting said absorptive load generator to said test bus and a switch interconnecting said reflective load generator to said test bus.

29. The system of claim 28 wherein said pair gain test line selection unit includes a pair gain test conflict detection unit for determining whether a pair gain test is already being performed on another telephony channel and, in response to a determination that a pair gain test is already being performed on another telephony channel, for generating a signal indicating that another pair gain test cannot currently be performed.

30. The system of claim 21 wherein the combined telephony/video transmission line is a co-axial cable and wherein said interface system is a co-axial cable termination unit.

31. The system of claim 30 wherein the co-axial cable termination unit is installed at the subscriber location.

* * * * *